(12) United States Patent
Prasannakumar et al.

(10) Patent No.: US 12,235,866 B2
(45) Date of Patent: Feb. 25, 2025

(54) METHOD AND SYSTEM FOR TEMPORARY REPLICATION AS DATA MOVER FOR CONTAINER-BASED APPLICATION MOBILITY

(71) Applicant: Dell Products L.P., Round Rock, TX (US)

(72) Inventors: Pooja Prasannakumar, Bangalore (IN); Thomas L. Watson, Richardson, TX (US); Prakash Venkatanarayanan, Framingham, MA (US); Nagasimha G. Haravu, Chapel Hill, NC (US); Girish Sheelvant, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 18/104,060

(22) Filed: Jan. 31, 2023

(65) Prior Publication Data
US 2024/0256562 A1 Aug. 1, 2024

(51) Int. Cl.
*G06F 16/27* (2019.01)
*G06F 16/2457* (2019.01)

(52) U.S. Cl.
CPC ........ *G06F 16/27* (2019.01); *G06F 16/24575* (2019.01)

(58) Field of Classification Search
CPC ............. G06F 11/1451; G06F 11/1469; G06F 11/2094; G06F 16/27; G06F 16/24575
See application file for complete search history.

(56) References Cited

U.S. PATENT DOCUMENTS

| | | | | |
|---|---|---|---|---|
| 11,782,750 | B2* | 10/2023 | Kumar | G06F 3/0659 718/1 |
| 2008/0177958 | A1* | 7/2008 | Cannon | G06F 3/0613 711/161 |
| 2009/0222498 | A1* | 9/2009 | Lu | G06F 16/10 |
| 2015/0096011 | A1* | 4/2015 | Watt | G06F 3/0647 726/15 |
| 2018/0095851 | A1* | 4/2018 | Zhang | G06F 11/2023 |
| 2020/0349095 | A1* | 11/2020 | Iyer | G06F 3/0604 |
| 2021/0149769 | A1* | 5/2021 | Balcha | G06F 11/1469 |
| 2021/0357132 | A1* | 11/2021 | Kumar | G06F 3/0647 |
| 2021/0357246 | A1* | 11/2021 | Kumar | G06F 11/1469 |
| 2022/0092024 | A1* | 3/2022 | Kavaipatti Anantharamakrishnan | G06F 16/125 |
| 2022/0308849 | A1* | 9/2022 | Kumar | G06F 8/61 |
| 2023/0082186 | A1* | 3/2023 | Balcha | G06F 11/2094 714/4.11 |
| 2023/0273741 | A1* | 8/2023 | Beedu | G06F 3/0604 711/154 |

* cited by examiner

*Primary Examiner* — Dennis Truong
(74) *Attorney, Agent, or Firm* — Terrile, Cannatti & Chambers, LLP; Emmanuel A. Rivera (57) ABSTRACT

Described herein are systems and methods for replication and moving data to provide for container-based application mobility. The configuration of the of the container-based application is determined and copied to an intermediate object storage. Depending on the replication compatibility of source array backing the source cluster and the target array backing the target cluster either a replication engine or data mover are used to move data. Configuration of the container-based application in the common storage is copied and stored to the target cluster. The target cluster is used to restore the container-based application.

20 Claims, 6 Drawing Sheets

METHOD AND SYSTEM FOR TEMPORARY REPLICATION AS DATA MOVER FOR CONTAINER-BASED APPLICATION MOBILITY

BACKGROUND OF THE INVENTION

Field of the Invention

The present invention relates to container-based applications running on information handling systems. More specifically, embodiments of the invention provide for replication and moving data to provide for container-based application mobility.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An emerging technology is container orchestration ecosystems employing container platforms, such as Kubernetes. Container orchestration ecosystems provide containers, where a container is a standard package of software, bundling application code along with configuration files and libraries. The use of container-based applications allows the ability to deploy applications seamlessly across various environments (e.g., information handling systems). Container platforms include clusters, which include a set of nodes or "machines". The nodes can include master and worker nodes that run containerized applications.

Given the ephemeral nature of container orchestration ecosystems (e.g., Kubernetes), provision should be made such that container-based applications that need to be highly available, can back up their data and configuration frequently to other clusters, preferably utilizing different hardware (e.g., platforms). This allows the container-based applications to be brought up without loss of data or state in a different cluster if the original cluster becomes unavailable. This also allows copies of the container-based applications to be brought up on other clusters often with point-in-time copies of the application data for purposes such as analytics, debugging, etc.

SUMMARY OF THE INVENTION

A computer-implementable method, system and computer-readable storage medium for moving container-based applications of a source cluster to a target cluster comprising initiating cloning of the source cluster of a container-based application to the target cluster; determining configuration of the container-based application; copying the configuration of the container-based application to an object storage; determining replication compatibility of source array backing the source cluster and the target array backing the target cluster; selecting replication if the source array and target array are replication compatible, or selecting data mover if the source array and target array are not replication compatible; copying configuration in object storage to the target cluster; and restoring the container-based application based on the target cluster.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Described herein are a system and methods that provides mobility of container-based applications from one (i.e., source) cluster to another (i.e., target) cluster, where the clusters can be backed by storage arrays. Moving the container-based applications from a source cluster to a target cluster includes moving configuration of a container-based application, as well as moving container-based application data from the storage array backing the source cluster to the storage array backing the target cluster. The container-based application can be brought up using the configuration and data that is moved. Array native replication is set up and used as data mover to move container-based application data from the source array to the target array to move the application from the source cluster to the target cluster.

Replication is typically used for disaster recovery and not for container-based application mobility. In disaster recovery, a container-based application fails over to server data directly from replica volumes. In various implementations, temporary configured replication is used as data mover to support mobility of container-based applications. Implementations provide for use of snapshots of replicas and clones created from the snapshots, and is distinguished from disaster recover scenarios where replication is usually used.

For certain instances, storage arrays may not support setting up a secondary replication session used for data mobility if a primary replication session is already set up to a disaster recovery site. Implementations provide for the use of clones to circumvent this problem without any duplication of the data at the source platform.

The use of native array replication to move data for container-based application mobility eliminates the need for copying the data over to an intermediate storage location, restoring the data to the target array from the intermediate location. Storage space and cost in an intermediate store, such as cloud storage, can also be avoided. Native array replication can be more efficient than known methods. The described data mover supports the use of source and target clusters that are backed by compatible storage arrays pre-configured for replication. A data mover is leveraged where the source and target clusters are backed by replication compatible arrays that are pre-configured for replication.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
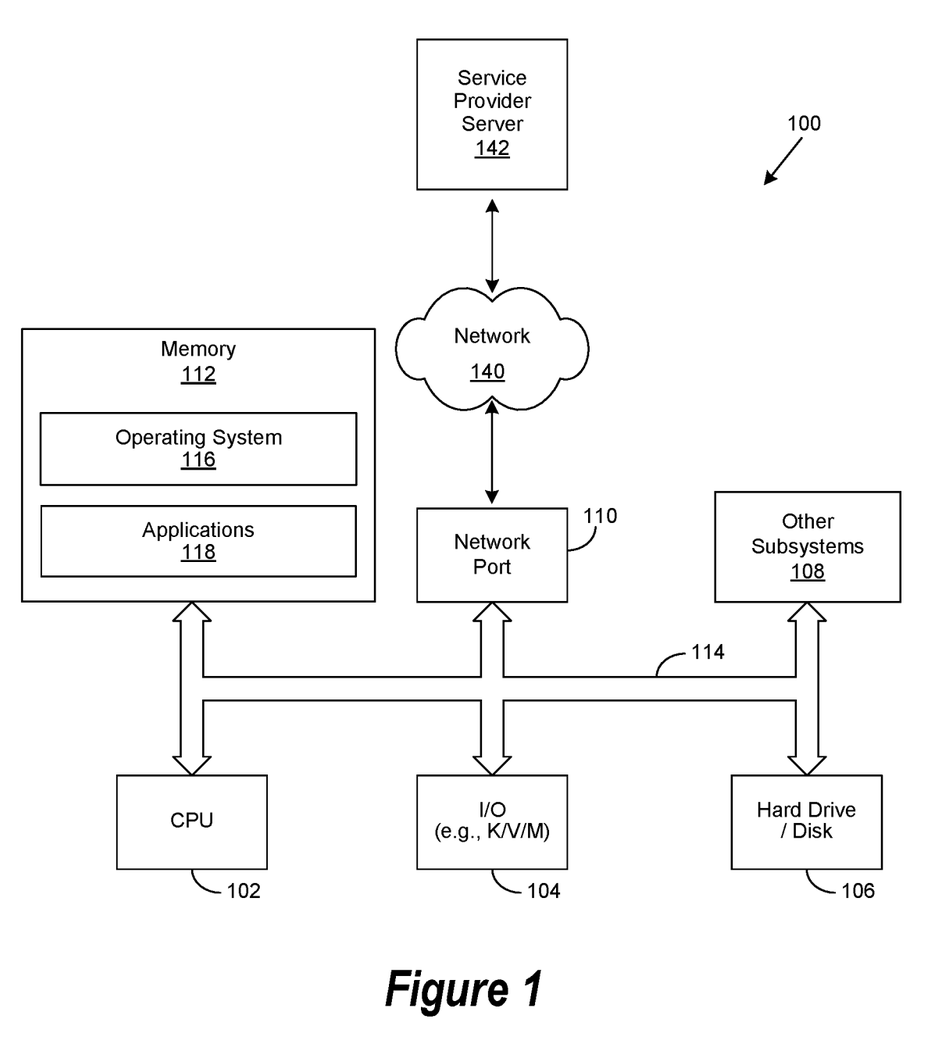
FIG. 1 is a general illustration of components of an information handling system as implemented in the present invention.

FIG. 1 is a generalized illustration of an information handling system (IHS) 100 that can be used to implement the system and method of the present invention. The information handing system (IHS) 100 can be a host to the peripheral devices described herein.

The information handling system (IHS) 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system (IHS) 100 also includes network port 110 operable to connect to a network 140, where network 140 can include one or more wired and wireless networks, including the Internet. Network 140 is likewise accessible by a service provider server 142.

The information handling system (IHS) 100 likewise includes system memory 112, which is interconnected to the foregoing via one or more buses 114. System memory 112 can be implemented as hardware, firmware, software, or a combination of such. System memory 112 further includes an operating system (OS) 116, and one or more application(s) 118.

Figure 2:
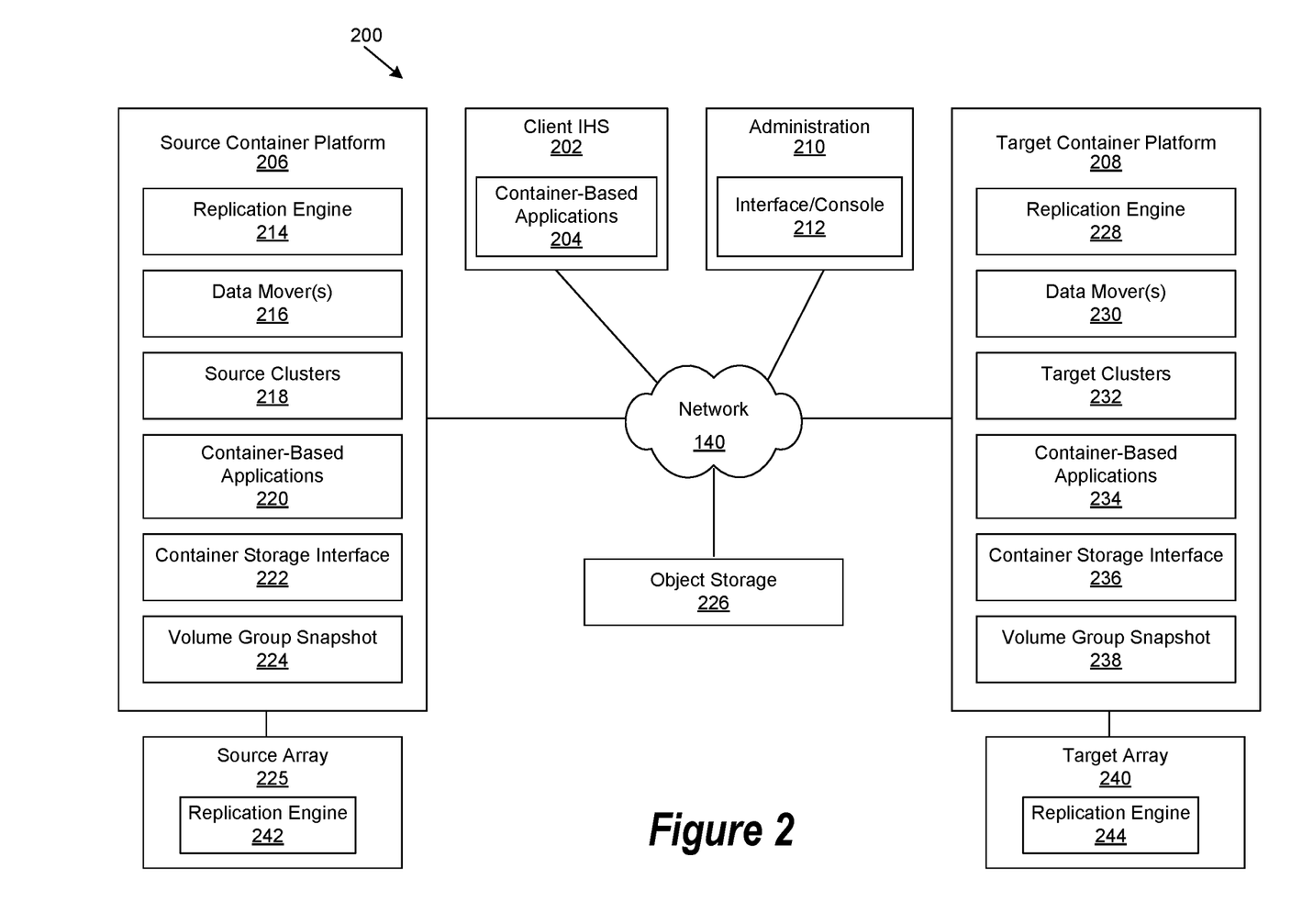
FIG. 2 illustrates a system as implemented in the present invention.

FIG. 2 illustrates a system 200 for replication and moving data to provide container-based application mobility. The system 200 represents a container orchestration ecosystem, such as systems based using Kubernetes. One or more client information handling systems, represented as client IHS 202 are included in the system 200. The client IHS 202 can be embodied as an IHS 100 as described in FIG. 1.

Implementations provide for client IHS 202 to include container-based application(s) 204, which can be container images or containers. A container image is a lightweight, standalone, executable package of software that includes what is used to run an application (i.e., include container-based application(s) 204), such as code, runtime, system tools, system libraries, and settings. Container images are used to instantiate containers at application runtime. The container image(s) or container(s) are designed to be standardized to be portable and secure, and lightweight to allow the ability to use or share an operating system of the client IHS 202.

Container-based application(s) 204 (i.e., container images/containers) can be provided by one or more container platforms, such as a source container platform 206 and a target container platform 208 further described herein.

Client IHS 202 is connected to network 140, where network 140 as described in FIG. 1, includes one or more wired and wireless networks, including the Internet. Network 140 connects the source container platform 206 and the target container platform 208 to other elements of system 200, including client IHS 202.

Implementations provide for the source container platform 206 and the target container platform 208 to be at different physical sites, and in certain implementations at the same physical site.

The system 200 further can include an administration element 210 which includes an interface/console 212 to access/communicate with client IHS 202, source container platform 206 and target container platform 208. The administration element 210 can be embodied as one or more IHS 100 as described in FIG. 1.

Implementations provide for the source container platform 206 to include a replication engine 214, data mover(s) 216, source cluster(s) 218, container-based applications 220, a container storage interface (CSI) 222, and a volume group snapshot 224, which are further described herein. Implementations provide for the source container platform 206 to include or access a source array (storage) 225. The CSI 222 is implemented to access source array 225. In certain implementations, the replication engine 213 is included in the source array 225.

In certain cases, an existing replication is used with replication engine 214. In other cases, a temporary replication can be used with replication engine 214. Temporary replication can be considered as configuring required volumes to be replicated. Once a transfer is complete, the volumes are removed from replication configuration.

The source container platform 206 can access (e.g., source clusters 218 accesses) an object storage 226. Object storage 226 can be implemented as an array, implemented as cloud storage, etc. Examples of object storage 226 includes RESTIC object storage.

Object storage 226 can be considered as a generalized metadata storage where metadata is copied. Metadata can be imported from source container platform 206 and exported by target container platform 208. Implementations provide for metadata to be configurations of configurations of container-based applications 220. Considering the data of container-based applications are relatively large, such data is moved from source array 225 to target array if replication can be used.

Implementations also provide for the target container platform 208 to also include a replication engine 228, data mover(s) 230, target cluster(s) 232, container-based applications 234, a container storage interface (CSI) 236, and a volume group snapshot 238, which are further described herein. Implementations provide for the platform container platform 208 to include or access a target array (storage) 240. The CSI 236 is implemented to target array 240. In certain implementations, the replication engine 228 is included in target array 240.

In certain cases, an existing replication is used with replication engine 228. In other cases, a temporary replication can be used with replication engine 228.

The target container platform 208 can access (e.g., target clusters 232 accesses) the object storage 226, which can include arrays, and volumes, which are further described herein. In particular, the CSI 236 is implemented to access target array 240.

In various implementations, the source array 225 includes a replication engine 242, and the target array includes a replication engine 244.

Figure 3A:
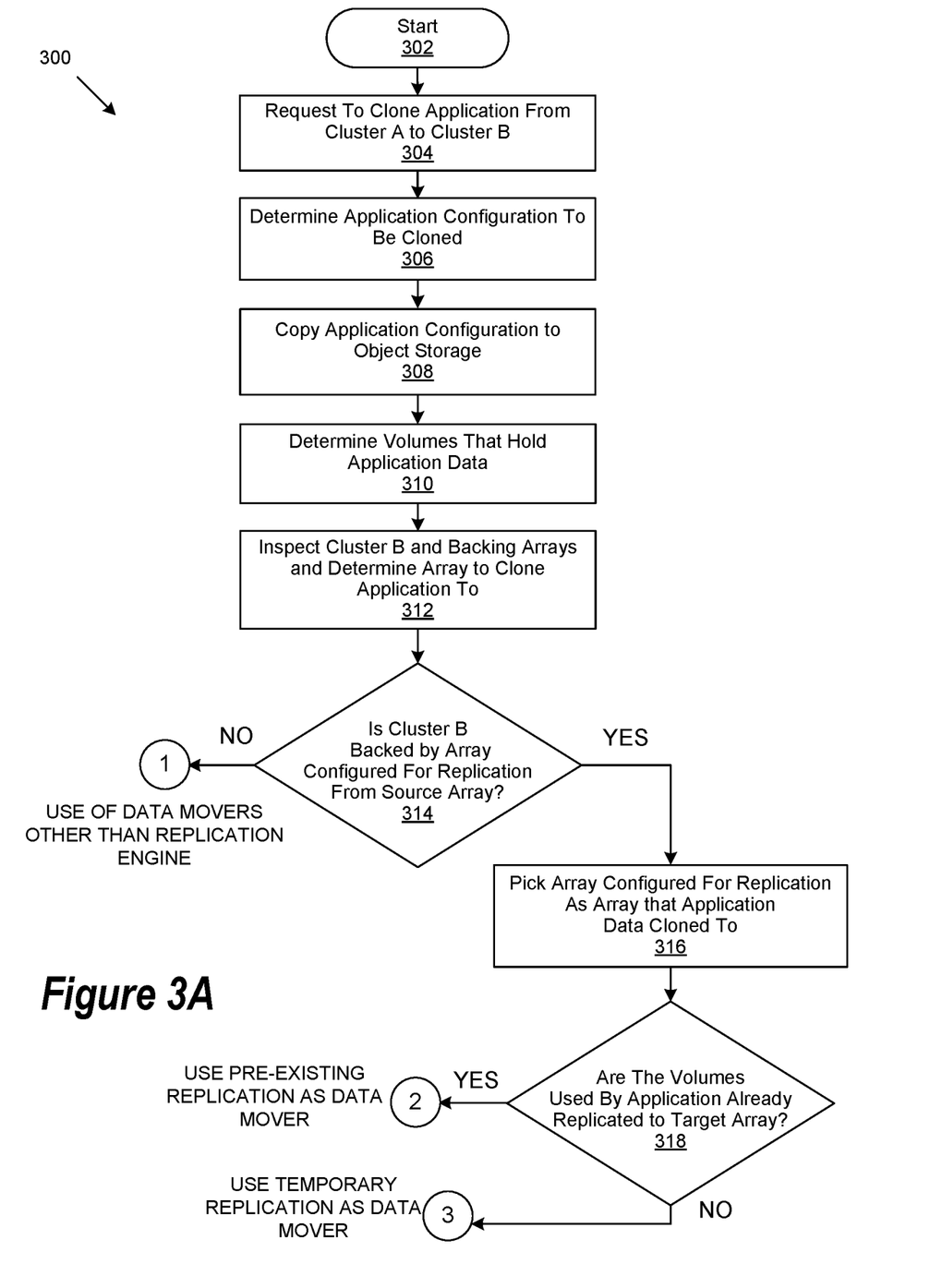
FIGS. 3A, 3B, and 3C are a generalized flowchart for using array native replication for moving data to provide for container-based application mobility.
Figure 3B:
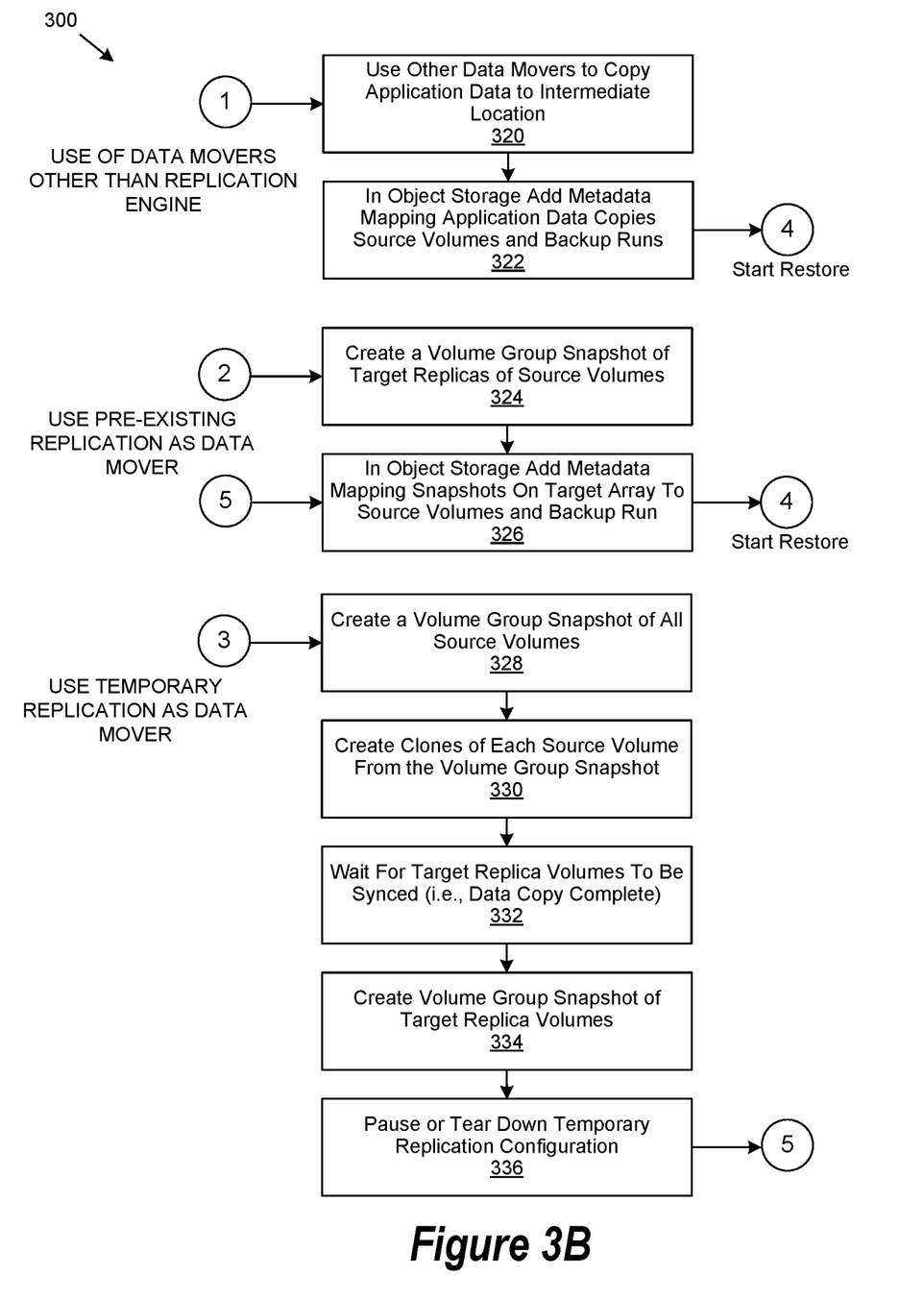
Figure 3C:
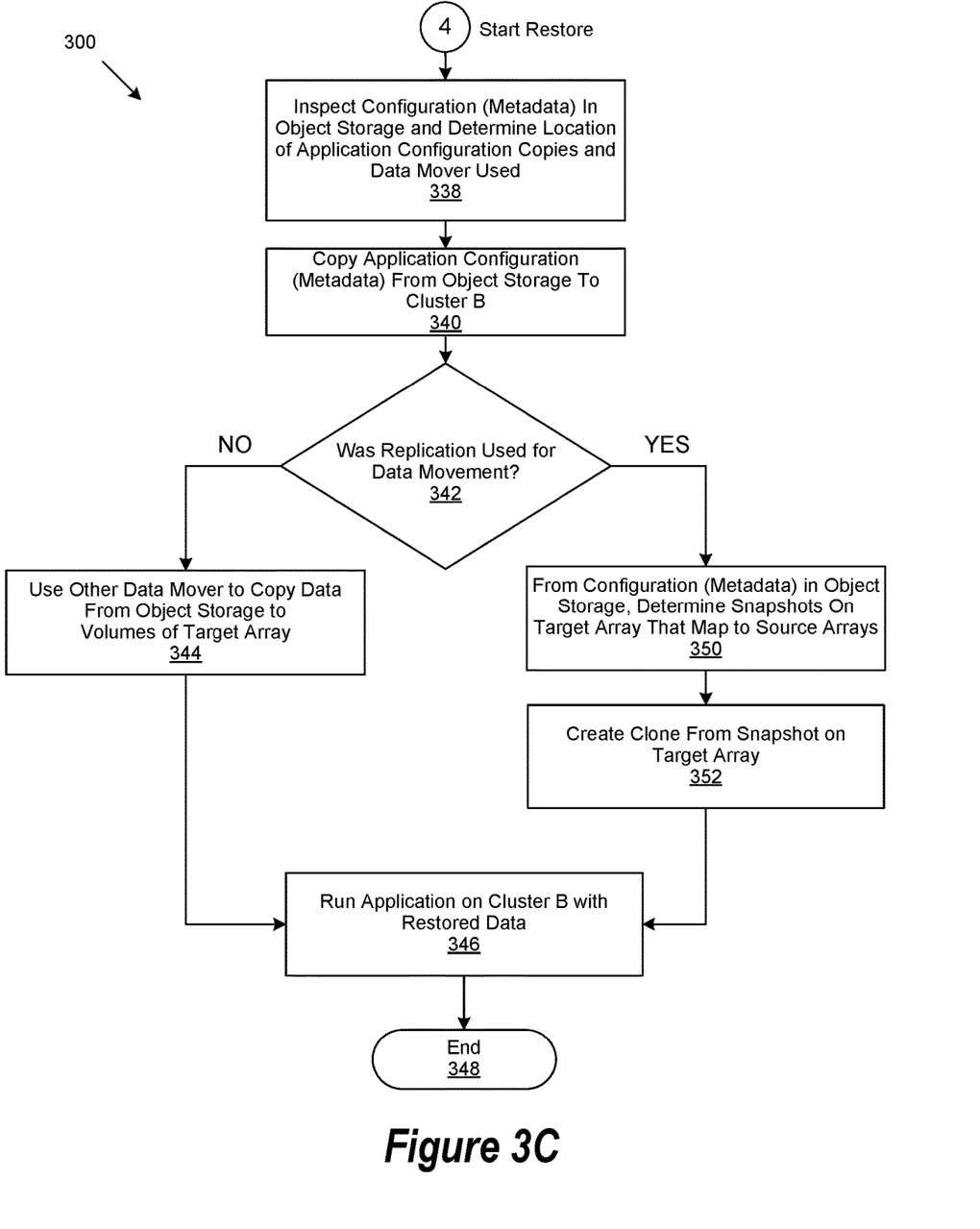

FIG. 3 shows a generalized flowchart for replication and moving data to provide container-based application mobility. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention. For example, implementations provide for the described system 200 of FIG. 2, to perform the process 300 and the steps described herein.

At step 302, the process 300 starts. At step 304, a request is performed to clone a container-based application 220 from source container platform 206 from a source cluster 218 to a target cluster 232 of target container platform 208. Implementations include the administration 210 initiated request (on demand) or a predetermined schedule of cloning. Implementations provide for specifying the container-based application 220 to be moved/copied by specifying namespace or labels to match as well as the target cluster 232 and namespace to move the container-based application 220.

At step 306, a determination is made as to configuration of the container-based application 220 to be copied/cloned. The configuration of the container-based application 220 can include namespaces, container pods, deployments, stateful sets, persistent volume claims, and other resources by matching namespaces or labels.

At step 308, the configuration of the container-based application 220 is copied to an intermediate storage in object storage 226. Copying the configuration of the container-based application 220 includes backing up resources, such as Kubernetes specific resources, that can include deployments, stateful sets, pods, persistent volume claims, etc., that make up the configuration of the container-based application 220.

At step 310, volumes in object storage 226 are determined as to which hold data for container-based application 220. In particular, determination is performed as to volumes used by the container-based application 220 by querying configuration of the container-based application 220.

At step 312, inspection is performed as to target cluster 232, and the arrays backing target cluster 232 inspection is performed as to target cluster 232, and the arrays (e.g., target array 240) backing target cluster 232. Object storage 226 can be implemented as an array, implemented as cloud storage, etc. Object storage 226 can be considered as a generalized metadata storage where metadata is copied. Considering the data of container-based applications are relatively large, such data is moved from source array 225 to target array if replication can be used.

Implementations provide for determining the target array 240 to clone/copy data of container-based application 220 to inspecting the target cluster 232, the arrays (e.g., target array 240) backing the target cluster 232, as well as the source array 225 backing the source cluster 218. In certain implementations, the source array 225 and target array 240 are replication compatible arrays that are pre-configured for replication.

At step 314, a determination is performed whether the target array backing the target cluster is configured for replication data from the source array. If the target array backing the target cluster is not configured for replication, following the NO branch of step 314, the use of data movers 216 other than replication engine 214 is used. If the target array backing the target cluster is configured for replication, following the YES branch of step 314, at step 316, a target array of object storage 226 is chosen that is configured for replication. The data of container-based application 220 is cloned/copied to that target array.

Each volume of object storage 226 that is used by container-based application 220 is inspected. At step 318, a determination is made if the volumes used by container-based application 220 are already replicated to the target array 240. If the volumes used by container-based application 220 are replicated to the target array 240, following the YES branch of step 318, existing replication is used. If the volumes used by container-based application 220 are not replicated to the target array 240, following the NO branch of step 318, temporary replication is used. If the volumes used by container-based application 220 are not replicated to the target array 240 off object storage 226, following the NO branch of step 318, temporary replication is used.

When data movers 216 are used other than the replication engine 214, following the NO branch of step 314, at step 320, the other data movers 216 are used to copy the data of container-based application 220 to an intermediate location in object storage 226. At step 322, in an intermediate storage location or object storage 226, that is accessible to both clusters, meta data is added that allows for mapping copies of data of container-based application 220, source volumes, and backup runs.

When pre-existing replication is used to move data, following the YES branch of step 318, at step 324, volume group snapshot 224 is created of target replicas of volumes in target array 240. If the volumes are already being replicated to the target array, determine the replicas of each volume. The volume group snapshot 224 is created of all the replica volumes on the target array. In an intermediate store location accessible to both clusters, information can be added as to individual snapshots on the target array that correspond to which source volumes.

At step 326, in an intermediate storage location, such as object storage 226, accessible to both clusters, meta data mapping is added to map snapshots on target storage 240 to source volumes and backup runs.

When temporary replication is used to move data, following the NO branch of step 318, at step 328, volume group snapshot 224 is created of volumes in source array 225. In such cases, the volumes are not already being replicated. The following can be implemented to support temporary replication of the volumes. The necessary quiescing/unquiescing of container-based application 220 is done when copy is taken, as a part of data transfer and this ensures a smooth restore on the target side/platform. As performed at step 328, a snapshot can be created of the volumes used by the container-based application 220.

At step 330, clones are created of each of the source volumes from the volume group snapshot 224. In various implementations, a replication group is created on the source cluster 218, which groups the clones and specifies the target array on object storage 226 as the remote array for replication. This can be performed by application/component that translates to array specific semantics to ensure that the volumes are replicated to the target array. Target volumes can be created on the remote target array. Protection groups can be created on the source array and target array per array semantics, which can involve creating volume groups with replication rules.

At step 332, wait is performed for target replica volumes to be synchronized. In other words, assuring that the data copy is complete. This indicates that the data from source clones have been replicated to the target volumes.

At step 334, a volume group snapshot 224 is created of the target replica volumes. At step 336, a pause or a tear down of the temporary replication configuration is performed. In other words, the replication is paused or deleted.

In certain implementations where replication of arrays is snapshot based, the replication group is paused and the replication session terminated saving resources; however, replica volumes and snapshots are retained. Subsequent requests to copy the same application can resume the replication and reuse the replication group.

In certain implementations where replication of arrays is journal based, the replication that is temporarily configured is deleted. Subsequent requests to copy the same application can involve setting up the replication configuration and performing a full synchronization to the target replica volume. Implementations provide that in an intermediate storage location, information is added as to which individual snapshots on the target array correspond to which source volumes and backup runs. Step 326 follows step 336.

Start restore follows from steps 322 and 326. At step 338, inspection as to meta data is performed as to intermediate storage location or object storage 226, to determine location of configuration copies of container-based application 220, and method used to move data (i.e., replication engine 214 or data mover 216).

At step 340, configuration of container-based application 220 is copied from object storage 226 to the target cluster 232. In other words, the configuration of container-based application 220 is copied from an intermediate location and applied to the target cluster 232. For each volume that the container-based application 220 uses, data is restored from the snapshot that is taken from the replica.

At step 342, a determination is made as to whether replication was used for data movement. If data mover 216 is used, following the NO branch of step 342, at step 344 data mover 216 is used to copy the data from the object storage 226 to target array volumes of object storage 226. At step 346, the container-based application 234 on target cluster 232 is run with restored data. At step 348, the process 300 ends.

If replication (replication engine 214) is used, following the YES branch of step 342, at step 350 from the meta data in the object storage 226, a determination is made as to the snapshots on the target array 240, that maps to source volumes on source array 225. At step 352, clones are created from the snapshot on the target array 240. At step 346, the container-based application 234 on target cluster 232 is run with restored data. At step 348, the process 300 ends.

Figure 4:
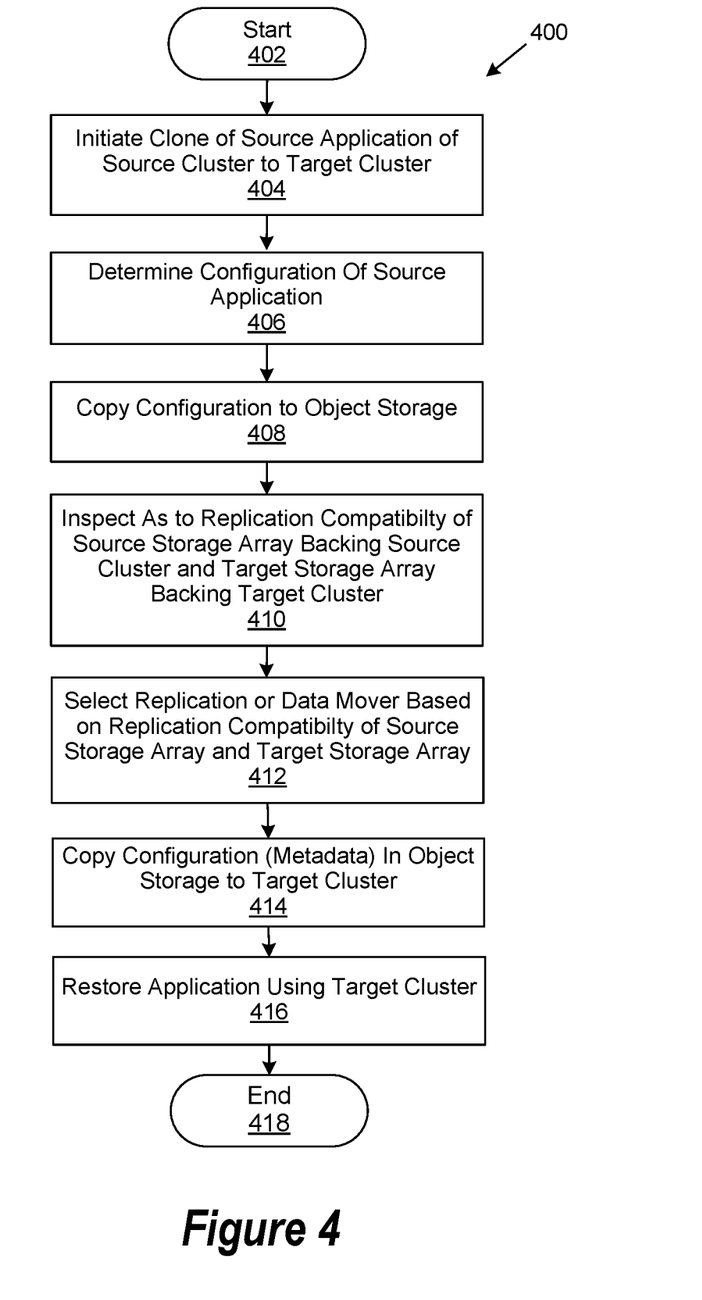
FIG. 4 is a generalized flowchart for moving container-based applications from a source cluster to a target cluster.

FIG. 4 shows a generalized flowchart for moving container-based applications from a source cluster to a target cluster. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

Moving container-based applications (e.g., container-based applications 220) from one cluster (e.g., source clusters 218) to another cluster (e.g., target clusters 232) requires moving the configuration of the container-based application, which includes, namespaces, resources, images, as well as the application data from the source cluster to the target cluster. Depending on the source and target clusters, the storage arrays that back these clusters, how the storage arrays are configured, different data movers could be used for moving the application data.

At step 402, the process 400 starts. At step 404, initiation is performed to clone source container-based application (e.g., container-based applications 220). In particular, the source cluster (e.g., source clusters 218) of the contain-based application is to be cloned to a target cluster (e.g., target cluster 232).

At step 406, the configuration of the source container-based application is determined. Configuration can include namespaces, container pods, deployments, stateful sets, persistent volume claims, and other resources.

At step 408, the configuration is copied to a object storage, such as object storage 226.

At step 410 inspection is performed as to the replication-compatibility and the whether the source array backing the source cluster and target array backing the target cluster are preconfigured for replication.

At step 412, At step 412, based on the replication compatibility and configuration of the source array and the target array container-based application data volumes are moved from the source array 226 to the target array 240. Otherwise, step 414 is performed.

At step 414, the configuration in the object storage 226 is copied to the target cluster. The configuration (metadata) from object storage 226 is copied to the target array 240.

At step 416, the source container-based application is restored using the target cluster. At step 418, the process 400 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for moving container-based applications from a source cluster to a target cluster comprising:
    establishing communication between a source container platform and a target container platform;
    initiating cloning from the source cluster of the source container platform of a container-based application to the target cluster of the target container platform;
    copying to an intermediate storage in an object storage, configuration of the container-based application that includes backing up resources that make up the configuration of the container-based application;
    determining volumes in the object storage that hold data for the container-based application, by querying configuration of the container-based application;
    determining replication compatibility of source array backing the source cluster and the target array backing the target cluster, wherein the source array and target are compiled as to the target cluster, and wherein replication compatibility is based on whether the source cluster and target cluster are preconfigured for replication;
    selecting replication if the source array and target array are replication compatible, and use pre-existing replication to move the data for the container-based application if the determined volumes are already replicated to the target array or use temporary replication to move the data for the container-based application if the determined volumes are not replicated to the target array, or selecting other data mover if the source array and target array are not replication compatible to copy data for the container-based application to the intermediate storage of the object storage;
    copying the configuration in the object storage to the target cluster; and
    restoring the container-based application on the target cluster based on the copied configurations and the selected replication or data mover.

2. The computer-implementable method of claim 1, wherein the configuration of the container-based application includes one or more of namespaces, container pods, deployments, stateful sets, persistent volume claims, and other resources.

3. The computer-implementable method of claim 1 further comprising determining volumes of the container-based application by querying the configuration of the container-based application, and if volumes are already replicated to target array, use pre-existing replication to move data.

4. The computer-implementable method of claim 3, wherein volume group snapshots are used for source volumes and target replica volumes.

5. The computer-implementable method of claim 1, wherein replication compatibility includes preconfigured source array and target array for replication.

6. The computer-implementable method of claim 1, wherein restoring determines meta data in the object storage, location of application configuration copies, and method of moving data.

7. The computer-implementable method of claim 6, wherein restoring determines method of moving data, and if replication from meta data in the object storage determine corresponding snapshots on the target array for the source volumes, and create clones from the snapshots on the target array for use by cloned container-based application, and if not replication, use data mover to copy data from the object storage to volumes of target array.

8. A system comprising:
a plurality of processing systems communicably coupled through a network, wherein the processing systems include non-transitory, computer-readable storage medium embodying computer program code interacting with a plurality of computer operations moving container-based applications from a source cluster to a target cluster comprising:
establishing communication between a source container platform and a target container platform;
initiating cloning from the source cluster of the source container platform of a container-based application to the target cluster of the target container platform;
copying to an intermediate storage in an object storage, configuration of the container-based application that includes backing up resources that make up the configuration of the container-based application;
determining volumes in the object storage that hold data for the container-based application, by querying configuration of the container-based application;
determining replication compatibility of source array backing the source cluster and the target array backing the target cluster, wherein the source array and target are compiled as to the target cluster, and wherein replication compatibility is based on whether the source cluster and target cluster are preconfigured for replication;
selecting replication if the source array and target array are replication compatible, and use pre-existing replication to move the data for the container-based application if the determined volumes are already replicated to the target array or use temporary replication to move the data for the container-based application if the determined volumes are not replicated to the target array, or selecting other data mover if the source array and target array are not replication compatible to copy data for the container-based application to the intermediate storage of the object storage;
copying the configuration in the object storage to the target cluster; and
restoring the container-based application on the target cluster based on the copied configurations and the selected replication or data mover.

9. The system of claim 8, wherein the configuration of the container-based application includes one or more of namespaces, container pods, deployments, stateful sets, persistent volume claims, and other resources.

10. The system of claim 8 further comprising determining volumes of the container-based application by querying the configuration of the container-based application, and if volumes are already replicated to target array, use pre-existing replication to move data.

11. The system of claim 10, wherein volume group snapshots are used for source volumes and target replica volumes.

12. The system of claim 8, wherein replication compatibility includes preconfigured source array and target array for replication.

13. The system of claim 8, wherein restoring determines meta data in the object storage, location of application configuration copies, and method of moving data.

14. The system of claim 13, wherein restoring determines method of moving data, and if replication from meta data in the object storage determine corresponding snapshots on the target array for the source volumes, and create clones from the snapshots on the target array for use by cloned container-based application, and if not replication, use data mover to copy data from the object storage to volumes of target array.

15. A non-transitory, computer-readable storage medium embodying computer program code for moving container-based applications from a source cluster to a target cluster, the computer program code comprising computer executable instructions configured for:
establishing communication between a source container platform and a target container platform;
initiating cloning from the source cluster of the source container platform of a container-based application to the target cluster of the target container platform;
copying to an intermediate storage in an object storage, configuration of the container-based application that includes backing up resources that make up the configuration of the container-based application;
determining volumes in the object storage that hold data for the container-based application, by querying configuration of the container-based application;
determining replication compatibility of source array backing the source cluster and the target array backing the target cluster, wherein the source array and target are compiled as to the target cluster, and wherein replication compatibility is based on whether the source cluster and target cluster are preconfigured for replication;
selecting replication if the source array and target array are replication compatible, and use pre-existing replication to move the data for the container-based application if the determined volumes are already replicated to the target array or use temporary replication to move the data for the container-based application if the determined volumes are not replicated to the target array, or selecting other data mover if the source array and target array are not replication compatible to copy data for the container-based application to the intermediate storage of the object storage;
copying the configuration in the object storage to the target cluster; and
restoring the container-based application on the target cluster based on the copied configurations and the selected replication or data mover.

16. The non-transitory, computer-readable storage medium of claim 15, wherein the configuration of the container-based application includes one or more of namespaces, container pods, stateful sets, deployments, persistent volume claims, and other resources.

17. The non-transitory, computer-readable storage medium of claim 15 further comprising determining volumes of the container-based application by querying the configuration of the container-based application, and if volumes are already replicated to target array, use pre-existing replication to move data.

18. The non-transitory, computer-readable storage medium of claim 17, wherein volume group snapshots are used for source volumes and target replica volumes.

19. The non-transitory, computer-readable storage medium of claim 15, wherein replication compatibility includes preconfigured source array and target array for replication.

20. The non-transitory, computer-readable storage medium of claim 15, wherein restoring determines meta data in the object storage, location of application configuration copies, and method of moving data.

\* \* \* \* \*